Patented Jan. 5, 1937

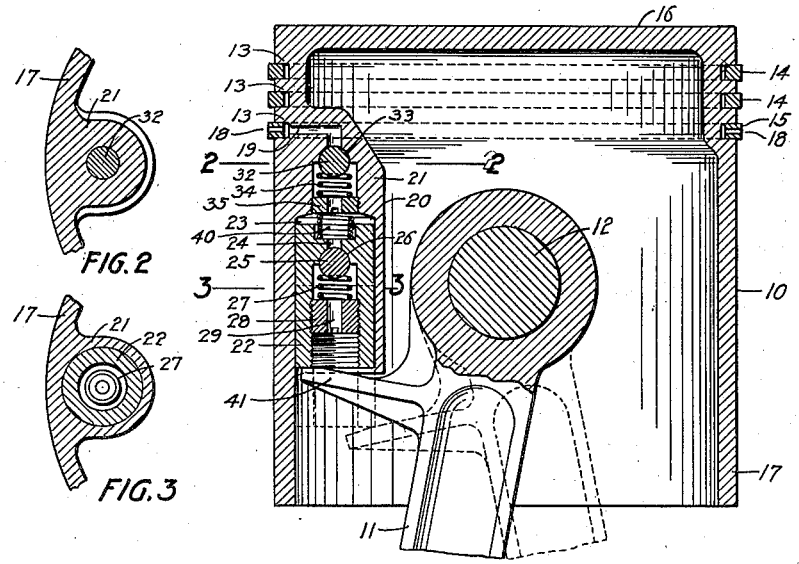
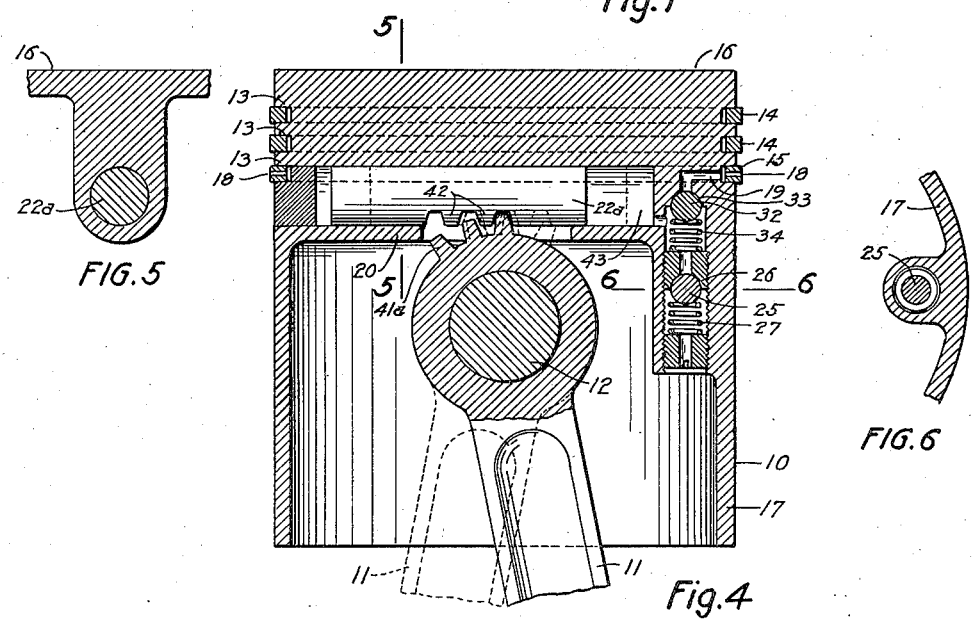

2,066,489

UNITED STATES PATENT OFFICE 2,066,489

PISTON OIL PUMP

S. Q. Shannon, Los Angeles, Calif.

Application September 17, 1935, Serial No. 40,870

11 Claims. (Cl. 309—8)

My invention relates to pistons particularly for internal combustion cylinders and the object of my invention is to provide a method by which the excess oil is withdrawn from between the piston and cylinder and returned to the oil reservoir and to provide certain preferred mechanisms by which the excessive loss of lubricating oil between the piston and the cylinder is avoided. I obtain these objects by the devices illustrated in the accompanying drawing in which Fig. 1 is a cross section taken through a piston and its connecting rod showing an auxiliary oil pump actuated by the rotational or pivotal movement of the piston rod; Fig. 2 is a section taken on the line —2—2— of Fig. 1 showing a detail of the construction of one valve of the oil pump; Fig. 3 is another section taken on the line —3—3— of Fig. 1 showing the oil pump plunger; Fig. 4 is a section of a piston showing another arrangement of the auxiliary oil pump of my invention; Fig. 5 is a section taken on the line —5—5— of Fig. 4 showing the auxiliary cylinder and plunger; Fig. 6 is a section taken on the line —6—6— of Fig. 4 showing a detail of the construction of one valve of the auxiliary oil pump.

Referring to the drawing in detail, 10 represents the piston in general, and 11 is the connecting rod which is pivoted on the piston pin 12. The piston 10 is provided with head 16 and skirt 17, and its cylindrical walls have grooves 13 provided for piston rings 14 and 15. In the usual internal combustion engine several piston rings are usually used near the piston head to seal the piston in the cylinder against the explosions above the head. Oil is supplied to the lower end of the cylinders by the usual "splash" feed from the crank shaft or by pressure feed and in the attempt to prevent too much oil from passing around the piston into the combustion chamber, it has become the practice to install below the pressure rings what is commonly known as an oil ring indicated in the drawing as 15. When the piston moves in the cylinder the oil film is collected or held back from the explosion chamber by the oil ring 15 but this is not always successful and some engines continue to "pump"—that is consume an excessive amount of oil. In my invention I use an oil ring 15 which has cut through it channels or ducts 18 through which the oil is conveyed to the piston ring groove 13. The groove of the oil ring is further provided with a duct 19 for conveying the collected oil to an auxiliary pump 20. This oil pump is preferably made in a boss 21 cast integrally with the piston as shown in Fig. 1 in a position parallel to the side walls or skirt 17 of the piston. The auxiliary pump consists of a plunger 22 which fits within a cylinder 23. The plunger 22 is provided with a valve mechanism consisting of a ball 25 which is pressed into a seat 26 by a coil spring 27 and controls the flow of oil through the plunger by way of the hole 24. This valve mechanism is held in place by a plug 28 which is screwed in or otherwise attached at the lower end of the plunger and is provided with an opening 29 through which the oil may be discharged. Between the duct 19 and the plunger in the auxiliary cylinder is provided an intake valve which consists of a ball 32 fitted into a seat 33 and held in place by a spring 34 and an apertured plug 35. This inlet valve controls the flow of oil from the channel 18 into groove 13 back of the oil ring 15 and through the conduit 19. Between the inlet valve and the plunger is a coil spring 40 which operates to keep the plunger in its lower position against the lever arm 41 on the connecting rod 11. As the connecting rod 11 rotates about the piston pin 12 due to the "throw" of the opposite end of the connecting rod as it operates with the crank shaft the lever arm 14 reciprocates the auxiliary plunger 22 in the auxiliary cylinder 23, the coil spring 40 acting to keep the plunger 22 in contact with the lever arm 41. On the down stroke of the auxiliary plunger the inlet valve is opened and allows the intake of oil through the duct 19. When the plunger is reversed and moves upward the ball valve 32 closes and the oil within the cylinder is forced out through the ball valve 25 and is discharged inside the piston skirt. The length of the plunger is adjusted to correspond to the vertical movement of the lever arm 41 and the cylinder wall is made of corresponding length so that the piston will always be partially within the cylinder. In Fig. 4 is shown another modification of my invention in which the auxiliary cylinder is located parallel to the head 16 of the piston. The plunger 22A may be made solid, that is, without valve mechanisms, the inlet and outlet valves being arranged in a separate boss cast parallel to the skirt of the piston. The plunger is notched or cut with teeth 42 which mesh with projections or teeth 41A on the connecting rod. The rotational movement of the connecting rod about the piston pin 12 provides a reciprocating motion to the plunger 22A. A ball inlet valve 32 operating in seat 33 and held in place by the spring 34 and the apertured plug 35 controls the flow of oil from the groove 13 behind the oil ring 15 through the duct 19 to the cylindrical space 43. The oil outlet is controlled through ball valve 25 in a seat 26 held by a spring 27 and a plug 28 having a hole 29. When the oil has been drawn into the cylindrical space 43 a reversal of the movement of the plunger 22A closes the inlet valve 32 and opens outlet valve 25 and permits the discharge of the oil inside the skirt of the piston.

While I prefer to have the auxiliary cylinder with its valves made integrally with the main piston it is not necessary that they be so made as they may be assembled separately and attached to the piston in any suitable manner it being only necessary that they be located in such a way that the pivotal movement of the connecting rod produces the reciprocating motion which provides the pump action. Although I have shown and described certain specific embodiments of my invention many modifications are possible and my invention is not therefore to be restricted except in so far as is necessitated by the prior art and by the spirit of the appended claims.

I claim:—

1. In a piston, piston pin and connecting rod assembly operable within a cylinder, an oil pump embodied with said piston having valves, a reciprocatable plunger adapted to be reciprocated by the connecting rod to withdraw oil from the contact surface of the piston with the cylinder walls, and means for discharging oil away from said contact surface.

2. In a piston, piston pin and connecting rod assembly operable within a cylinder, an auxiliary cylinder embodied with said piston, valve means, an auxiliary piston adapted to be reciprocated by the connecting rod to withdraw oil from the contact surface of the main piston with its cylinder walls, and means for discharging oil away from said contact surface.

3. In combination, a piston, a connecting rod pivotally attached to said piston, an oil pumping means embodied with said piston and adapted to be actuated by the connecting rod, and means for discharging oil to the interior of said piston.

4. In combination, a piston, a connecting rod pivotally attached to said piston, an oil pump having a reciprocatable plunger and valves embodied with said piston and adapted to be actuated by the connecting rod, and means for discharging oil to the interior of said piston.

5. In combination, a piston, a connecting rod pivotally attached to said piston, an oil pump comprising an auxiliary cylinder with an auxiliary piston and valve means embodied with the main piston and adapted to be actuated by the connecting rod, and means for discharging oil to the interior of said piston.

6. In combination, a piston operable within a cylinder, a connecting rod pivotally attached to said piston, oil collecting means attached to said piston for collecting excess oil between the piston and the cylinder, oil pumping means actuated by the connecting rod, conduit means for conveying oil from the collecting means to the intake of the pumping means, and means for discharging oil to the interior of said piston.

7. In combination, a piston having a piston ring groove and operable within a cylinder, a connecting rod pivotally attached to said piston, a piston ring having ducts adapted to convey collected oil to the groove in the piston, oil pumping means actuated by the connecting rod, and conduit means for conveying oil from the groove in the piston to the intake of the pumping means.

8. In combination, a piston having a piston ring groove and operable within a cylinder, a connecting rod pivotally attached to said piston, a piston ring having ducts adapted to convey collected oil to the groove in the piston, an oil pumping means embodied with said piston having a reciprocatable plunger and valve means and adapted to be actuated by the connecting rod, and conduit means for conveying oil from the piston ring groove to the intake of the oil pump.

9. In combination, a piston having a piston ring groove and operable within a cylinder, a connecting rod rotatably attached to said piston and having a lever arm for reciprocating an auxiliary piston, a piston ring having ducts adapted to convey collected oil to the groove in the piston, an oil pump embodied with said piston comprising an auxiliary cylinder with an auxiliary piston and valve means and adapted to be actuated by the lever arm of the connecting rod, and conduit means for conveying oil from the piston ring groove to the intake of the oil pump.

10. In combination, a piston having a piston ring groove and operable within a cylinder, a connecting rod pivotally attached to said piston and having a lever arm for reciprocating an auxiliary piston, a piston ring having ducts adapted to convey collected oil to the groove in the piston, an oil pump comprising an auxiliary cylinder embodied with said main piston, a plunger within said auxiliary cylinder having an oil outlet therethrough controlled by a valve means, a compression spring means within said auxiliary cylinder adapted to press said plunger against the lever arm of said connecting rod, conduit means for conveying oil from the piston ring groove to the intake of the oil pump, and valve means adapted to prevent the back flow of oil from the auxiliary cylinder and plunger to the piston groove.

11. In combination, a piston having a piston ring groove and operable within a cylinder, a connecting rod pivotally attached to said piston and having a lever arm for reciprocating an auxiliary piston, a piston ring having ducts adapted to convey collected oil to the groove in the piston, an oil pump comprising an auxiliary cylinder embodied with said main piston, a plunger within said auxiliary cylinder, an inlet valve means for controlling the flow of oil from the piston ring groove into the auxiliary cylinder as the plunger is moved in one direction, an outlet valve means for controlling the flow of oil from the auxiliary cylinder to the inside of the piston skirt when the plunger is moved in the opposite direction, conduit means for conveying oil from the piston ring groove to the cylinder, and conduit means for conveying oil from the auxiliary cylinder to the inside of the piston skirt.

S. Q. SHANNON.